United States Patent [19]

Martin

[11] 4,438,885
[45] Mar. 27, 1984

[54] MANURE LOADER

[75] Inventor: Mervin G. Martin, Myerstown, Pa.

[73] Assignee: Hedlund Manufacturing Co., Inc., Boyceville, Wis.

[21] Appl. No.: 374,549

[22] Filed: May 3, 1982

Related U.S. Application Data

[63] Continuation of Ser. No. 119,523, Feb. 7, 1980, abandoned.

[51] Int. Cl.³ .............................................. B02C 19/00
[52] U.S. Cl. ............................ 241/101 B; 241/101.7; 241/260.1
[58] Field of Search ................... 198/518, 676, 677; 241/101 B, 101.7, 260.1

[56] References Cited

U.S. PATENT DOCUMENTS

| | | | |
|---|---|---|---|
| 2,417,186 | 3/1947 | Birt | 198/518 X |
| 2,571,300 | 10/1951 | Simpson | 241/260.1 X |
| 3,030,080 | 4/1962 | Hise et al. | 198/518 X |
| 3,133,727 | 5/1964 | Luscombe | 241/101 B |
| 3,735,932 | 5/1973 | Bradley | 241/101 B X |

Primary Examiner—Howard N. Goldberg
Assistant Examiner—Timothy V. Eley
Attorney, Agent, or Firm—Jacobson & Johnson

[57] ABSTRACT

A loader for feeding manure into open top spreaders is disclosed which includes a heavy duty scoop within which a transverse auger is rotatably carried. The auger includes a plurality of square blades which are arranged upon a shaft in the form of a helix to direct the manure to a loading tube having a remote outlet for loading purposes. The square blades of the auger are formed to provide a plurality of openings intersected by blade chopper segments to provide a unique chopping action. An impeller is rotatable within the loading tube to carry the manure from the scoop to the disposal outlet.

16 Claims, 9 Drawing Figures

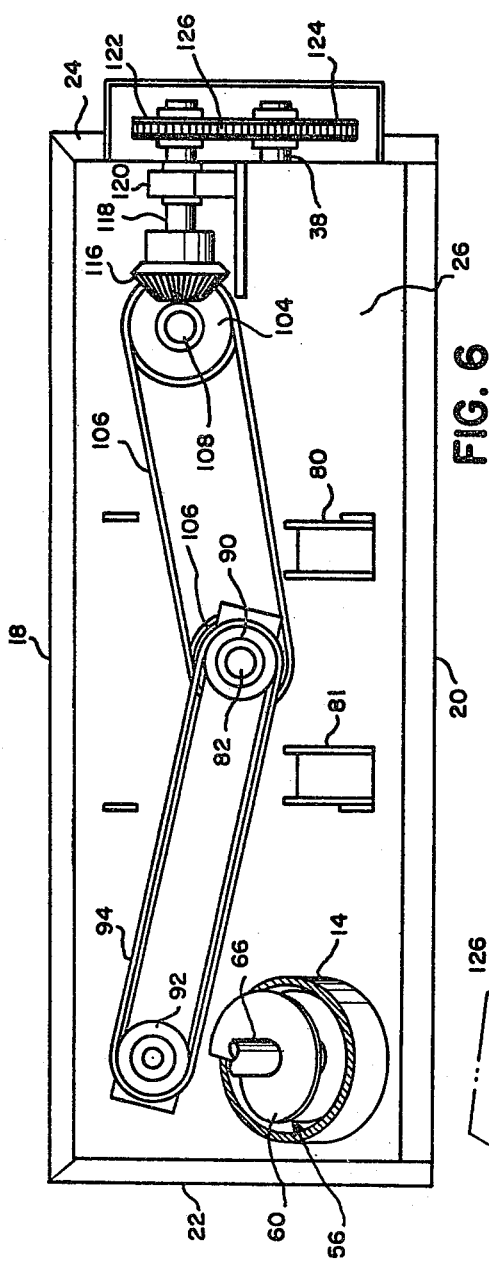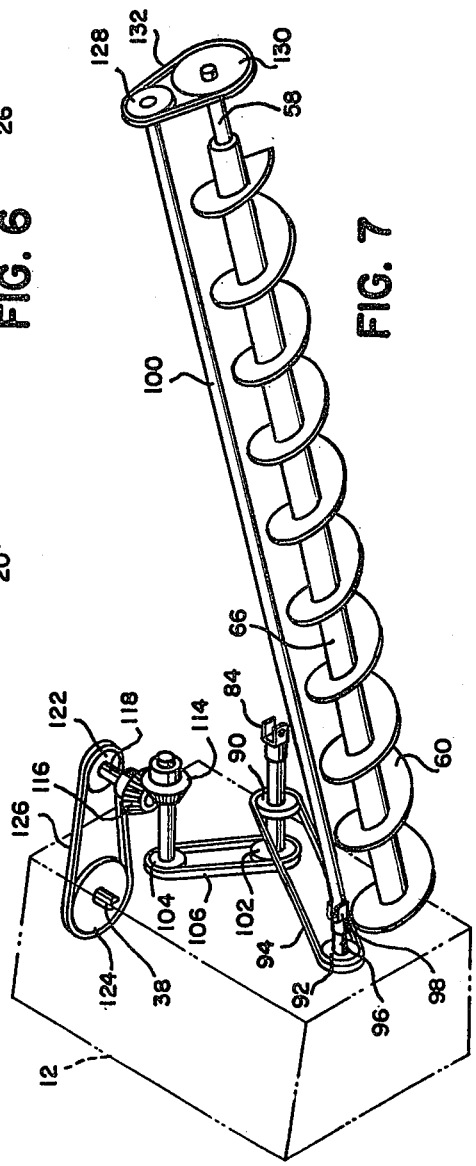

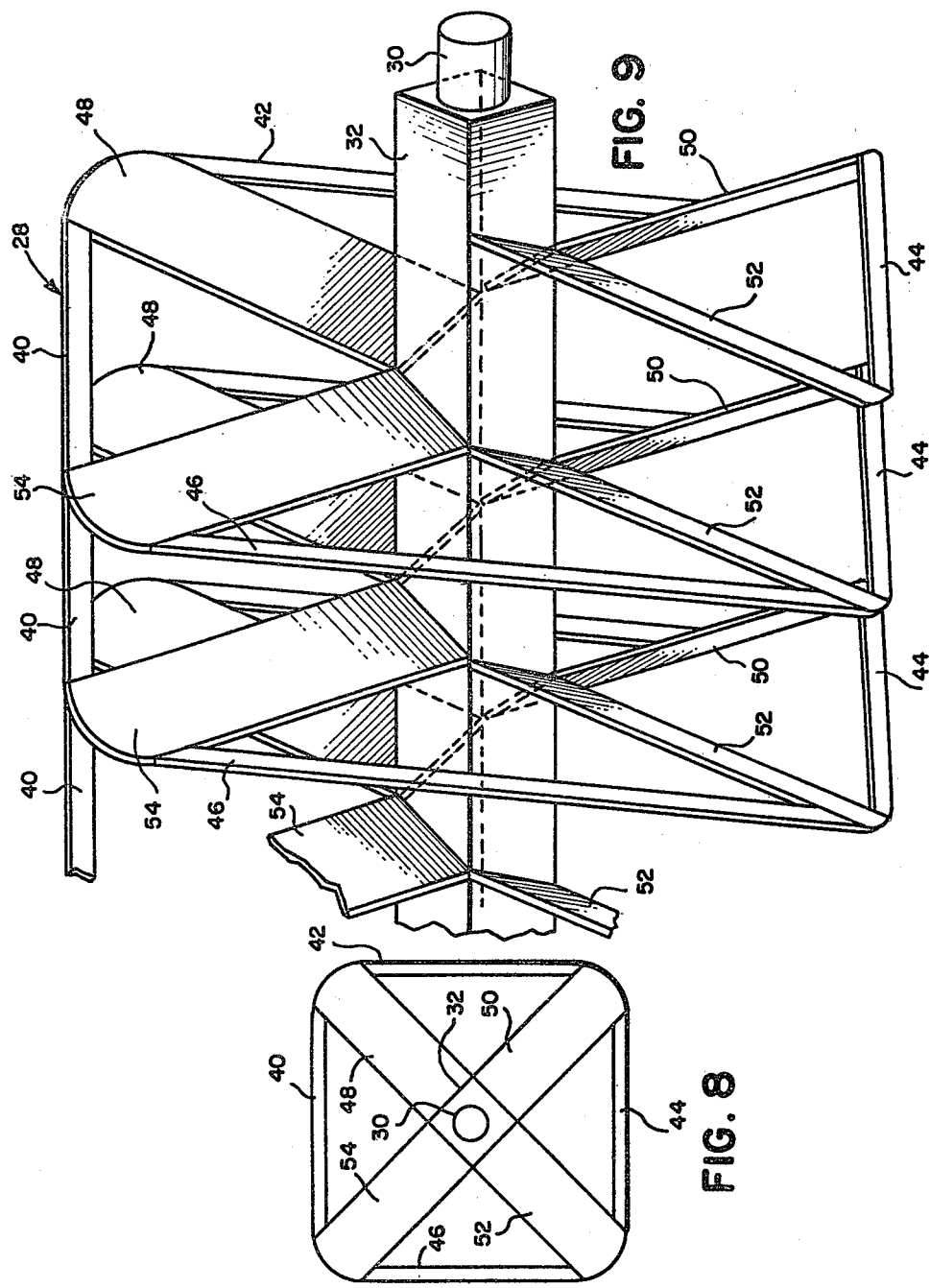

MANURE LOADER

This is a continuation of application Ser. No. 119,523, filed Feb. 7, 1980, now abandoned.

BACKGROUND OF THE DISCLOSURE

The present invention relates generally to the field of manure loaders, and more particularly, is directed to a loader capable of loading in a single apparatus a substantially complete range of manures from substantially solid or semi-solid to substantially all liquid.

It is the common practice to utilize the fertilizer value of animal manures, for example diary cattle manures, in and about the fields of farms to provide an effective and readily available material to enhance the growing of the crops. Certain of the available manures are relatively solid in nature and have to be both loaded and spread by equipment of specialized construction and design suitable for use with solid type manures. Similarly, other of the manures are relatively wet and such manures are usually further liquified and then other specialized loading and spreading equipment is utilized to handle and spray the liquid type manures. Generally speaking, the equipment suitable for solid and semi-solid materials is not suitable for use with liquid and semi-liquid materials. Accordingly, depending upon the nature of the product to be handled, farmers usually have to employ equipment of both types, thereby increasing equipment costs both in the original capital investment and in the maintenance requirements for such equipment.

More recently, universal spreading equipment suitable to handle a wide range of manures varying substantially from quite liquid to quite solid have now become available. One such universal spreader has been developed by the applicant and is the subject matter of copending patent application, Ser. No. 119,523 entitled "Manure Spreader", now abandoned.

SUMMARY OF THE INVENTION

The present invention relates generally to the field of manure loaders, and more particularly, is directed to a universal loader capable of loading manure in the complete range from granular dry, through semi-solid materials and substantially all the way up to very liquid manures.

The loader of the present invention includes a heavy duty scoop within which a square blade auger is journalled to direct manure toward one side thereof. A conventional hook up attachment derives power and mobility in known manner from farm equipment, such as a tractor, to rotate the auger within the scoop, to rotate the loader impeller within the loading tube and to move and direct the scoop as may be necessary.

The square blades of the auger are designed with open spaces intersected by blade chopper segments to help chop up manure crusts or other solids which may be present in the manure being loaded. The square shape of the blades aids in picking up manure from the pile and in propelling it to the loader tube impeller. By directing the heavy duty scoop into the manure pile wherein the manure can be contacted by the auger, manures which were formerly too dry to pump and manures which were formerly too wet to auger by utilizing previously available equipment can now be conveniently handled and loaded by utilizing the single piece of apparatus which forms the subject matter of the present application.

It is therefore an object of the present invention to provide a novel manure loader of the type set forth.

It is another object of the present invention to provide an improved manure loader comprising a heavy duty scoop within which is journalled for rotation a unique auger comprising a plurality of blades arranged in a helix wherein each of the blades is formed with a plurality of open spaces and a plurality of blade chopper segments interrupting the open spaces and providing a chopping action.

It is another object of the present invention to provide a novel manure loader comprising a heavy duty scoop, an auger equipped with square blades rotatable within the scoop to drive or propel manure towards one side of the scoop, a loader impeller receiving manure from the auger and transporting the manure through a loader tube to an outlet suitable to load an open top spreader.

It is another object of the present invention to provide a novel manure spreader comprising a scoop means, an auger means rotatable within the scoop means, the auger means including a plurality of chopper blades arranged in a helix, impeller means receiving the manure from the auger means for discharge to a spreader and a drive means interconnecting the auger means and the impeller means for simultaneous rotation thereof and for transportation of a wide variety of manures in the range from substantially all liquid to substantially all solid.

It is another object of the present invention to provide a novel manure loader that is rugged in construction, simple in design and troublefree when in operation.

Other objects and a fuller understanding of the invention will be had by referring to the following description and claims of a preferred embodiment thereof, taken in conjunction with the accompanying drawings, wherein like reference characters refer to similar parts throughout the several views and in which:

FIG. 3 is an enlarged, detailed, perspective view of the square blade auger of the present invention.

FIG. 6 is a cross sectional view taken along line 6—6 on FIG. 2, looking in the direction of the arrows.

FIG. 7 is a schematic, perspective view showing the loader drive arrangement.

FIG. 8 is an end elevational of the square blade auger shown in FIG. 3.

FIG. 9 is an enlarged perspective of the square blade auger showing the construction of the blade chopper segments affixed to the auger body.

DESCRIPTION OF THE PREFERRED EMBODIMENT OF THE INVENTION

Figure 1:
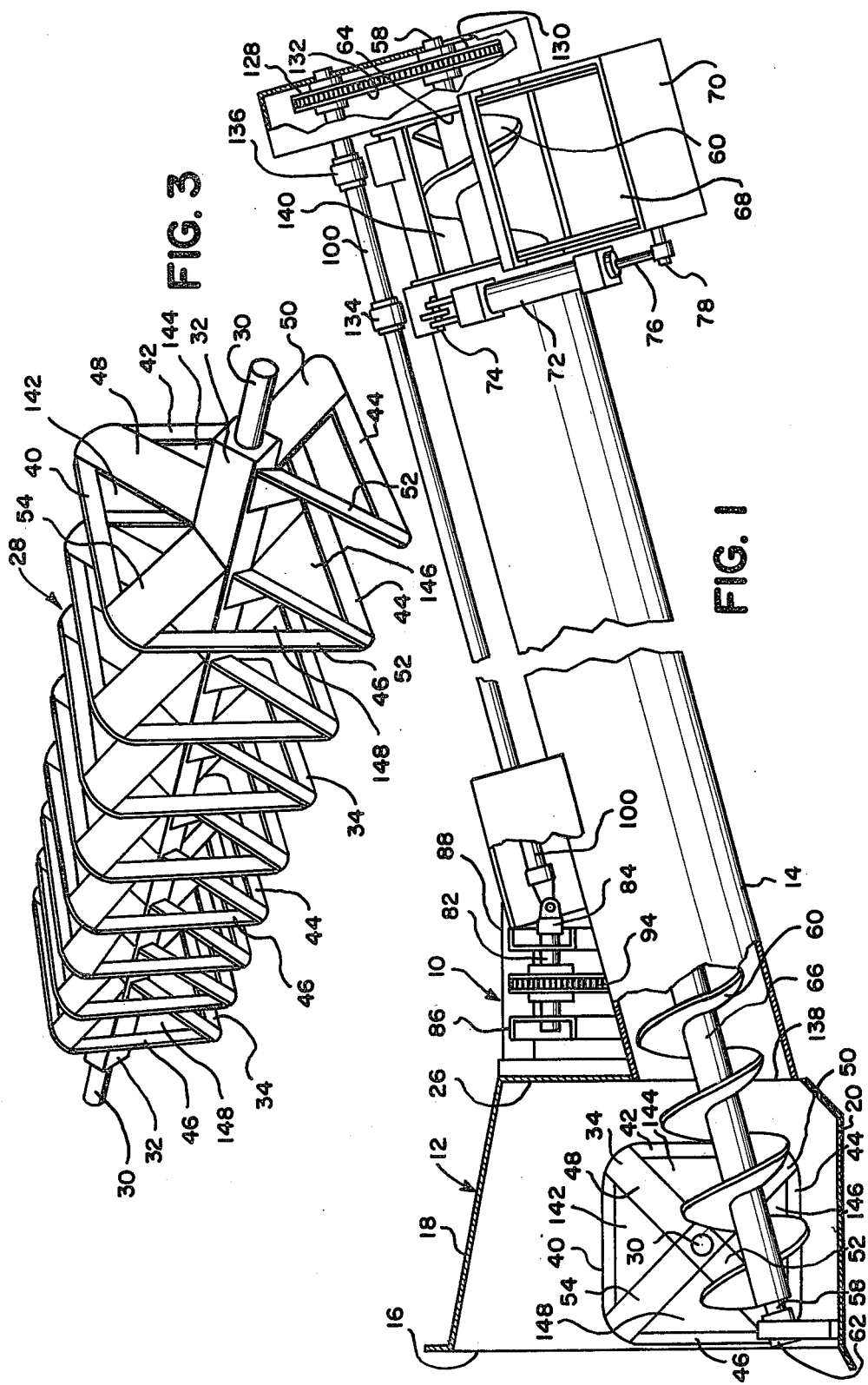
FIG. 1 is a side elevational view of the loader of the present invention, partially broken away to expose interior construction details.

Although specific terms are used in the following description for the sake of clarity, these terms are intended to refer only to the particular structure of the invention selected for illustration in the drawings and are not intended to define or limit the scope of the invention.

Figure 2:
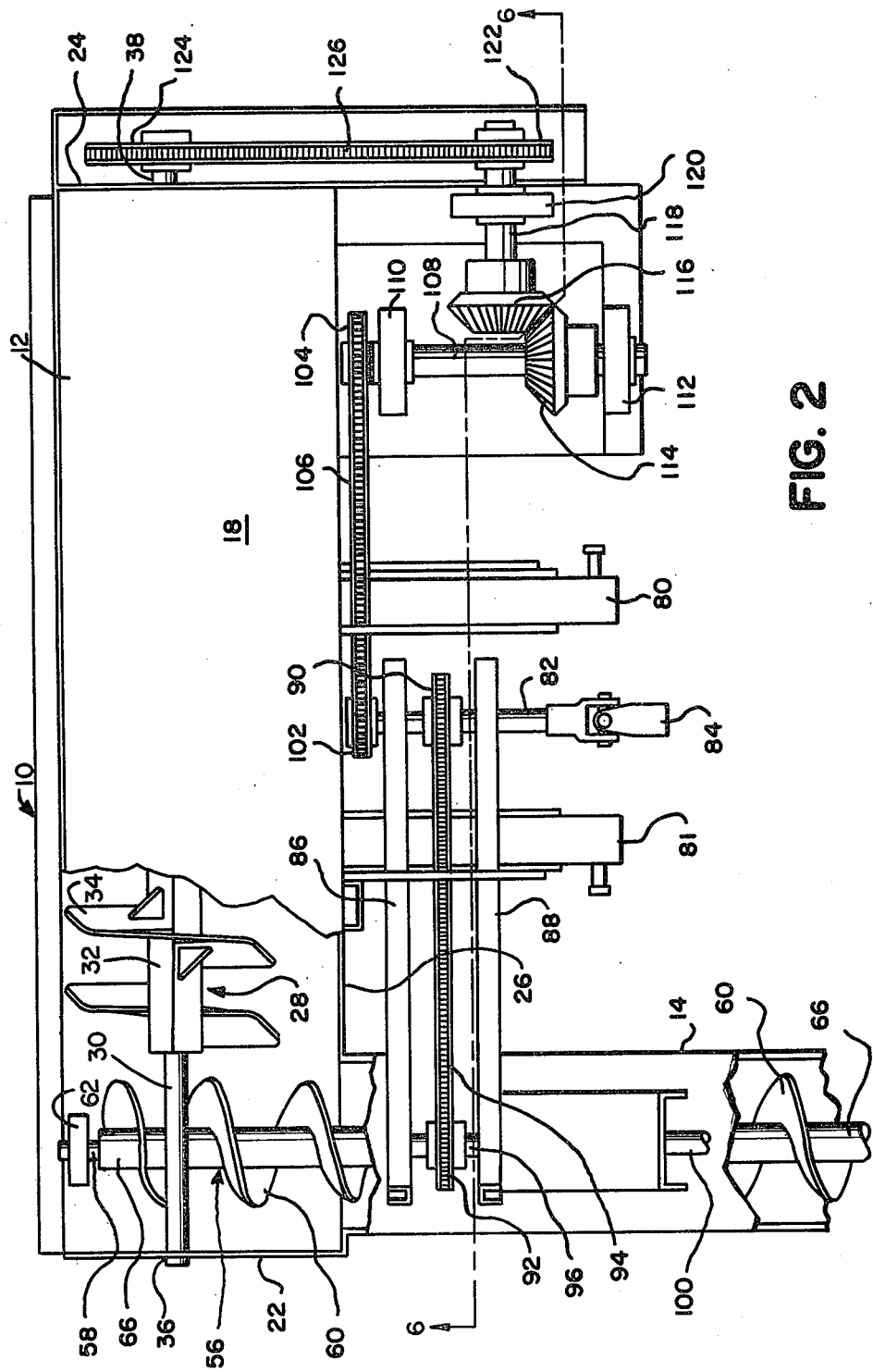
FIG. 2 is a partial, top plan view of the loader of FIG. 1, partially broken away to expose interior construction details.

Referring now the the drawings, there is illustrated in FIGS. 1 and 2 a manure loader, generally designated 10, which comprises in combination a front heavy duty scoop 12 and a rearwardly connecting and rearwardly extending loading tube 14.

The scoop 12 is formed to a suitable shape, for example generally rectangular as indicated, and has an open front 16 defined by spaced top and bottom sections 18, 20, a left side 22 and a right side 24. A rear wall 26 rearwardly closes the rectangular shape defined by the bottom 20, the tip 18 and the left and right sidewalls 22, 24 to provide a sturdy, manure scooping enclosure. The front 16 of the scoop 12 is entirely open to facilitate the entrance of manure (not shown) to the vicinity of the heavy duty auger 28. Thus, when the scoop 12 is urged into a pile of manure to be transported (not shown) by a suitable piece of farm equipment, for example a tractor (also not shown), the manure can readily enter the loader 10 through the open scoop front 16.

Figure 4:
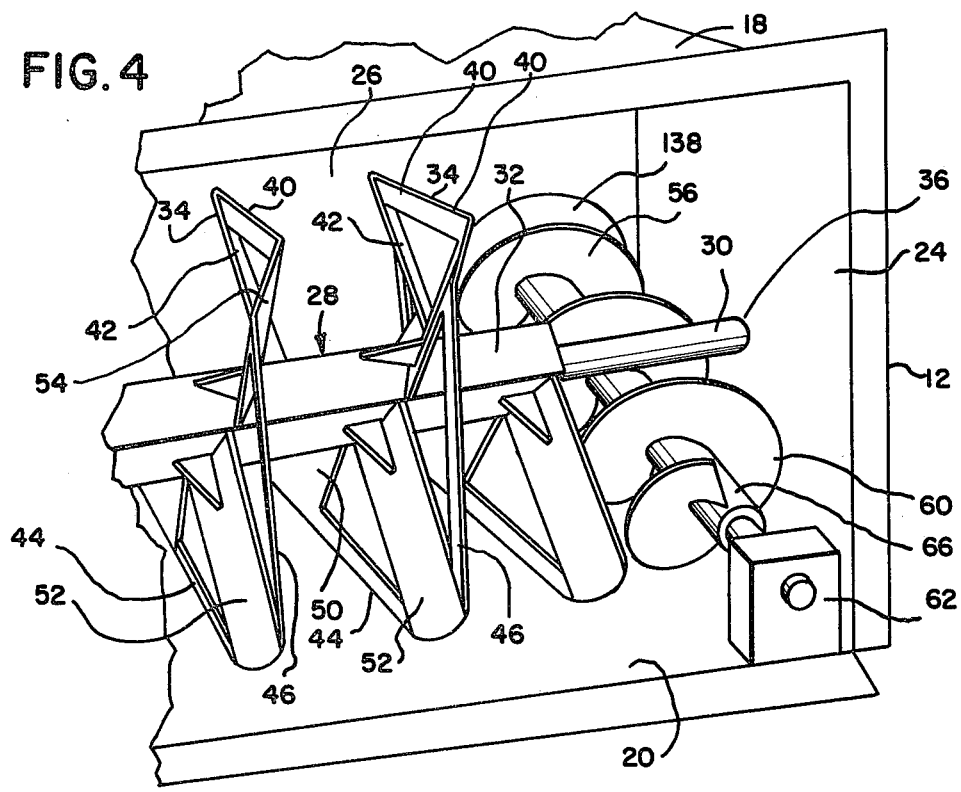
FIG. 4 is an enlarged, perspective, partial view of the right side of the scoop showing the interaction between the scoop auger and the loader impeller.

As illustrated in FIGS. 1, 2, 4 and 7, the loading tube 14 rearwardly communicates with and extends from the scoop 12 and receives the manure (not shown) propelled to the right as viewed in FIG. 4 by the auger 28. The opening 138 is provided in the scoop rear wall 26 for manure delivery to the unloading chute 68 upon rotation of the impeller 56. As shown, the blades 34 of the auger 28 are arranged in a helix to drive the manure (not illustrated) from left to right as viewed in FIG. 4. The impeller 56 functions between the interior of the scoop 12 and the unloading chute 68 to pick up manure delivered by the auger 28 and to transport it to the unloading chute 68 for delivery at a desired point of disposal, for example the body or tank of a manure spreading vehicle (not illustrated).

Referring now to FIGS. 1, 2, 3 and 4, the auger 28 comprises generally a transverse shaft 30 which is rotatable in conventional manner within left and right bearings 36, 38 which are mounted in suitable known manner respectively in the left and right sides 22, 24 of scoop 12. An elongated square body 32 is affixed to the shaft 30 in a secure, sturdy interconnection, such as by welding. A continuous drive comprising a plurality of open, angular blades 34 extend about the body 32 in the general configuration of a helix to propel the manure directed to within the scoop 12 from one sidewall 22 toward the opposite sidewall 24 for pickup by the impeller 56 for loading purposes as hereinafter more fully set forth.

Still referring to FIGS. 1-4, the auger 28 comprises a plurality of interconnected blades 34 arranged in the general configuration of a helix to direct the manure (not illustrated) from left to right as viewed in FIG. 4. The individual blades 34 are preferably square in configuration and include a plurality of radially extending, angularly arranged, sturdy chopper segments 48, 50, 52, 54, which segments are circularly offset one from the other through ninety degrees. Interconnected between the ends of circularly adjacent chopper segments respectively are a plurality of individual, similar, peripheral segments 40, 42, 44, 46. The peripheral segments are substantially equally spaced from the auger shaft 30 and are arranged to define a generally square configuration when the auger 28 is viewed in cross section. The respective chopper segments 48, 50, 52, 54 and peripheral segments 40, 42, 44, 46 define respectively therebetween a plurality of openings 142, 144, 146, 148 which are provided to permit the entrance therein of portions of the manure (not illustrated) whereby any crust or other solids that may be present will be chopped or otherwise reduced in size by action of the chopper segments 48, 50, 52, 54 as the auger 28 is rotated within the scoop 12.

As illustrated, the respective longitudinal axes of the peripheral blade segments 40, 42, 44, 46 are respectively angularly offset from the sides defining the square auger body 32 through an angle of forty-five degrees to thereby offset through forty-five degrees the square shape defined by the blade peripheral segments 40, 42, 44, 46 from the square cross section configuration of the auger body 32. As illustrated, each peripheral blade segment 40, 42, 44, 46 is formed of sturdy sheet steel, for example one inch in width and one quarter inch in thickness and each of the peripheral segments 40, 42, 44, 46 has its flat sides aligned in a radial plane which is positioned substantially at right angles to the axis of the shaft 30.

The chopper blades 48, 50, 52, 54 are similarly formed of sturdy steel sheet, of wider configuration for manure movement purposes, for example four inch by one quarter inch sheet steel. As illustrated, the blade chopper segments 48, 50, 52, 54 are positioned to project radially outwardly relative to the shaft 30 and are circularly offset at ninety degree intervals. Each blade chopper segment is respectively affixed at its inward terminus to a flat surface of the body 32 and extends radially outwardly therefrom. Each chopper blade segment 48, 50, 52, 54 terminates outwardly in a curved end and one of the respective blade peripheral segments 40, 42, 44, or 46 extends between and is securely affixed to the ends of circularly adjacent chopper blade segments. The respective inward ends of the chopper blade segments 48, 50, 52, 54 are each affixed to a flat surface of the body 32 in suitable, secure manner, such as by welding. As best seen in FIGS. 3, 4 and 8, each of the blade chopper segments is angularly offset from a plane drawn perpendicular to the axis of the shaft 30 in a forward direction whereby the forwardly facing flat surface of each blade chopper segment acts as blade or paddle to urge the manure (not shown) in a direction from left to right as viewed in FIG. 4 when the shaft 30 and the affixed auger body 32 are rotated. As illustrated, each blade chopper segment 48, 50, 52, 54 is positioned on the auger body 32 in the general configuration of a helix at a leading angle of approximately thirty degrees from a plane drawn perpendicular to the axis of the shaft 30. In this manner, as the auger 28 is rotated, each blade chopper segment aids in urging the manure (not shown) toward the inpeller 56.

The impeller 56 includes an impeller shaft 58 which is rotatable between a front or lower bearing 62 which may be positioned within the open interior of the scoop 12 and the rear or upper bearing 64 which is secured in the vicinity of the unloading chute 68. A cylindrical body 66 overfits and is secured to the shaft 58 in a manner to support and rotatively carry the continuous blades 60. As illustrated, the blades 60 are formed in the configuration of a helix for manure transport purposes upwardly through the loading tube 14. The impeller 56 is rotatively carried within the loading tube 14 and extends the full length thereof whereby the lower end of the impeller 56 is positioned within the scoop 12 for the introduction or loading of manure and the upper or outer end of the impeller 56 extends to the unloading chute 68 for unloading of the transported manure.

Figure 5:
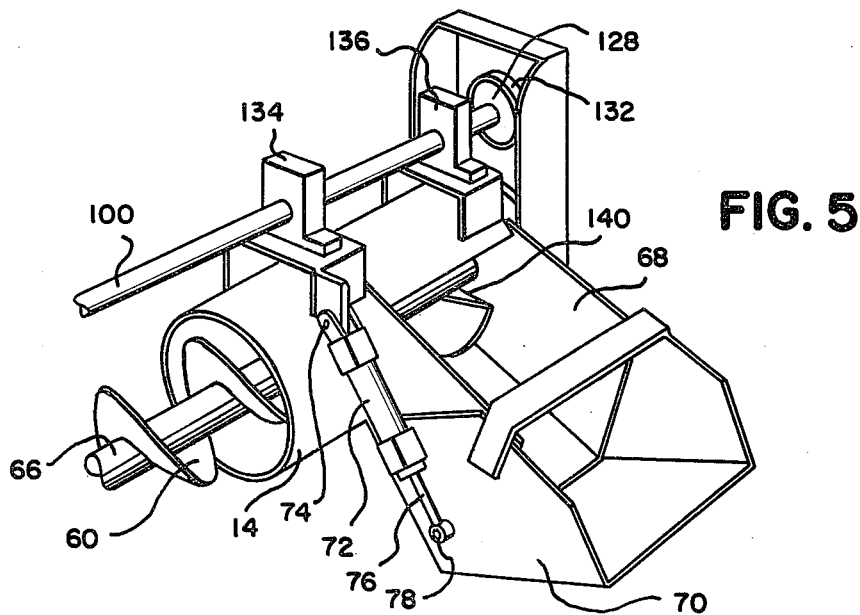
FIG. 5 is an enlarged, partial, perspective view of the unloading end of the apparatus.

Referring now to FIGS. 1 and 5, it will be seen that the unloading chute 68 comprises an adjustable unloading gate 70 which can be pivoted relative to the loading tube 14 upon operation of the cylinder 72. The cylinder 72 is activated by the usual hydraulic lines and controls (not illustrated) which are available on farm equipment, such as a tractor, to function the piston arm 76 reciprocally relative to the cylinder 72 for unloading gate position adjustment purposes. The cylinder 72 is pivotally pinned at the connection 74 to a stationary portion of the loading tube 14 and its piston arm 76 terminates in a pinned connection 78 which is affixed to the adjustable gate 70. Accordingly, when the cylinder 72 is activated to reciprocate the piston arm 76, the adjustable gate 70 can be pivoted relative to the loading tube 14 to any most desirable position for loading into another piece of equipment, for example a manure spreader (not illustrated). The loading tube 14 is provided with an upper opening 140 in alignment with the unloading chute 68 whereby manure transported through the loading tube 14 upon rotation of the impeller 56 can exit the loading tube 14 through the opening 140 for the desired spreader loading purposes.

Referring now to FIGS. 2, 6 and 7, the drive mechanism of the manure loader 10 will now be described. Power from a tractor (not illustrated) is taken in conventional manner at the coupling 84 to rotate the main drive shaft 82. Rotation of the main drive shaft 82 simultaneously rotates the two pinned sprockets, namely the impeller drive sprocket 90 and the auger drive sprocket 102. The impeller drive sprocket 90 rotatively drives the impeller driven sprocket 92 through the chain drive 94. Accordingly, when the main drive shaft 82 is rotated, rotative power is directly transmitted to the impeller drive shaft 96, and through the coupling 98, to the impeller drive shaft extension 100.

Rotation of the auger drive sprocket 102 turns the auger driven sprocket 104 through the chain drive 106 and the auger driven sprocket 104 which is pinned to the shaft 108, rotates the drive shaft 108 within the fixed bearings 110, 112. Also pinned on the drive shaft 108 is a bevel gear 114 in a manner whereby the gear 114 rotates when driven sprocket 104 is rotated. A cooperating bevel gear 116 transmits rotative forces through the drive shaft 118 to rotate the shaft within the fixed bearings 120. A cooperating auger drive sprocket 122 is pinned or otherwise affixed to the shaft 118 to rotate when the shaft 118 is powered. The auger drive sprocket 122 simultaneously rotates the auger driven sprocket 124 through the chain drive 126 in conventional manner. As illustrated, the auger shaft 130 extends through the scoop left sidewall affixed bearing 38 in an extension to which the driven sprocket 124 is pinned or otherwise affixed. Accordingly, when the chain drive 126 is activated to rotate the driven sprocket 124, this results in rotation of the auger 28 to move the manure from left to right as viewed in FIG. 4 within the scoop 12.

As best seen in FIGS. 1 and 7, the impeller drive shaft extension 100 extends exteriorly of the loading tube 14 and is rotatively carried within the bearings 134, 136 to rotate the endwardly affixed impeller drive sprocket 128. The impeller drive sprocket 128 in turn rotates the impeller shaft sprocket 130 through the chain drive 132. Accordingly, when the impeller drive shaft 96 is rotated upon activation of the chain drive 94, the power is transmitted through the coupling 98 and the shaft extension 100 to rotate the shaft extension affixed impeller drive sprocket 128. Thus a single drive system coupled to the main drive shaft 82 is utilized to rotate simultaneously both the auger 28 and the impeller 56 to drive manure (not illustrated) completely through the apparatus for loading purposes at a desired unloading station or location.

In operation, the manure loader 10 is physically connected to a prime mover, for example a tractor (not shown) through the left and right hitches 80, 81 in any suitable, known manner to facilitate movement of the heavy duty scoop 12 into a pile of manure (not shown) to be loaded. Rotative power is taken from the tractor power output connection (not shown) in usual manner by interconnecting the coupling 84 to permit the tractor drive to rotate the main drive shaft 82. Hydraulic lines (not illustrated), when used, can also be taken from the tractor for usual connection to the hydraulic cylinder 72 in well known manner whereby the adjustable gate 70 may be pivoted relative to the loading tube 14 for unloading the manure in a suitable desired loaction.

Although the invention has been described with a certain degree of particularity, it is understood that the present disclosure has been made only by way of example and that numerous changes in the details of construction and the combination and arrangement of parts may be resorted to without departing from the spirit and scope of the invention.

I claim:

1. In a loading apparatus suitable for loading liquid and semi-liquid materials, the combination of:
   scoop means to pick up a load of material;
   the scoop means including enclosing sidewalls defining an open front to admit the material therethrough and a right side and a left side;
   auger means rotatable within the scoop means to direct the material from one side toward the other, the auger means comprising a shaft and blades rotatable with the shaft,
   at least some of the blades being provided with openings suitable to chop the material as the blades are rotated;
   loading means in material communication with the scoop means to pick up the directed material and to unload the material at a location remote from the scoop means, and
   drive means to rotate the auger means and drive the loading means.

2. The loading apparatus of claim 1 wherein at least some of said blades are square in configuration.

3. The loading apparatus of claim 1 wherein said blade comprises a plurality of interconnecting blade chopper segments and blade peripheral segments.

4. The loading apparatus of claim 3 wherein the openings in said blades is defined by at least one of said blade chopper segments and one of said blade peripheral segments.

5. The loading apparatus of claim 3 wherein each of the openings is defined by two of said blade chopper segments and one of said blade peripheral segments.

6. The loading apparatus of claim 3 wherein said blade peripheral segments comprising each blade are four in number, said blade peripheral segments being respectively endwardly interconnected to form a square configuration.

7. The loading apparatus of claim 6 wherein said blade chopper segment terminates at and interconnects with two of said blade peripheral segments.

8. The loading apparatus of claim 6 wherein each of said blade peripheral segments includes a planar flat surface, said flat surface lying in a plane that is substantially perpendicular to the axis of said shaft.

9. The loading apparatus of claim 3 wherein said auger means further comprises an elongated body of square cross sectional configuration affixed about said shaft.

10. The loading apparatus of claim 9 wherein said blade peripheral segments are secured to and extend from said shaft.

11. The loading apparatus of claim 9 wherein the square configuration defined by said blades is circularly offset from the square configuration defined by said auger by forty-five degrees.

12. The loading apparatus of claim 3 wherein said blade chopper segments project radially outwardly from said shaft.

13. The loading apparatus of claim 3 or 12 wherein said blade chopper segments are angularly inclined to a plane drawn perpendicular to the axis of the auger means shaft.

14. The loading apparatus of claim 12 wherein each of said blade chopper segments is circularly offset from the next adjacent blade chopper segment by ninety degrees.

15. The loading apparatus of claim 1 wherein said loading tube includes a loading tube inlet and said impeller extends through said loading tube inlet to pick up material from within the scoop.

16. The loading apparatus of claim 1 wherein said drive means is adapted to simultaneously drive said auger means and said impeller.

* * * * *